(12) United States Patent
Haramaty et al.

(10) Patent No.: US 10,554,556 B2
(45) Date of Patent: Feb. 4, 2020

(54) NETWORK ELEMENT WITH CONGESTION-AWARE MATCH TABLES

(71) Applicant: MELLANOX TECHNOLOGIES TLV LTD., Raanana (IL)

(72) Inventors: Zachy Haramaty, Hemed (IL); Ilya Vershkov, Rishon Lezion (IL); Aviad Raveh, Bat Hefer (IL); Matty Kadosh, Hadera (IL); Aviv Kfir, Nili (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 15/671,166

(22) Filed: Aug. 8, 2017

(65) Prior Publication Data

US 2019/0052564 A1 Feb. 14, 2019

(51) Int. Cl.
*H04L 1/00* (2006.01)
*H04L 12/801* (2013.01)
*H04L 12/861* (2013.01)
*H04L 12/741* (2013.01)
*H04L 12/26* (2006.01)
*H04L 12/823* (2013.01)

(52) U.S. Cl.
CPC .............. *H04L 47/11* (2013.01); *H04L 43/16* (2013.01); *H04L 45/745* (2013.01); *H04L 47/12* (2013.01); *H04L 47/32* (2013.01); *H04L 49/90* (2013.01)

(58) Field of Classification Search
CPC ....... H04L 47/11; H04L 45/745; H04L 49/90; H04L 43/16; H04L 47/12; H04L 47/32
See application file for complete search history.

(56) References Cited

U.S. PATENT DOCUMENTS

| | | | |
|---|---|---|---|
| 2005/0047334 A1* | 3/2005 | Paul | H04L 12/5601 370/229 |
| 2007/0201499 A1* | 8/2007 | Kapoor | H04L 47/10 370/412 |
| 2013/0250762 A1* | 9/2013 | Assarpour | H04L 49/103 370/235 |
| 2014/0219090 A1* | 8/2014 | Ramanathan | H04L 47/122 370/235 |
| 2015/0026361 A1* | 1/2015 | Matthews | H04L 67/28 709/234 |
| 2017/0048144 A1* | 2/2017 | Liu | H04L 47/122 |
| 2017/0118108 A1* | 4/2017 | Avci | H04L 47/12 |

OTHER PUBLICATIONS

Arista Networks, "User Manual: Arista EOS", version 4.17.1F, 2446 pages, Aug. 12, 2016.
Open Networking Foundation, "OpenFlow Switch Specification", Version 1.5.0 ( Protocol version 0x06 ), 277 pages, Dec. 19, 2014.
The P4 Language Consortium, "The P4 Language Specification", Version 1.0.3, 97 pages, Nov. 2, 2016.

* cited by examiner

*Primary Examiner* — Abdelnabi O Musa
(74) *Attorney, Agent, or Firm* — Kligler & Associates Patent Attorneys Ltd.

(57) ABSTRACT

A network element includes a plurality of ports and processing circuitry. The ports are configured for connecting to a communication network. The processing circuitry is configured to receive a packet from the communication network via one of the ports, to assign the packet to a selected queue, to verify whether the packet matches a rule, wherein matching the packet to the rule depends on whether the selected queue is congested, and, when the packet matches the rule, to apply to the packet an action associated with the rule.

10 Claims, 2 Drawing Sheets

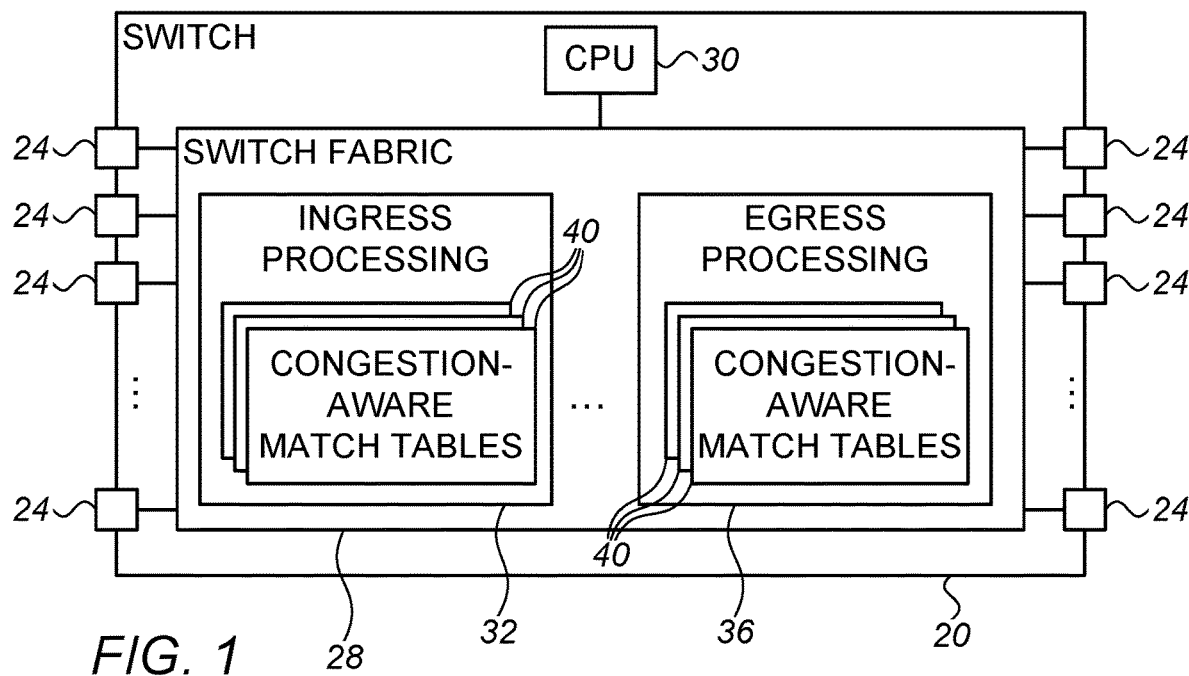
FIG. 1
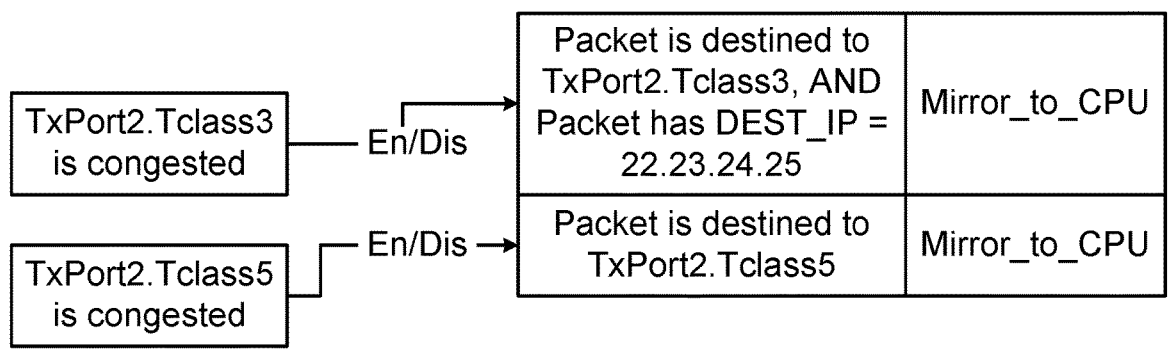
FIG. 2
FIG. 3

NETWORK ELEMENT WITH CONGESTION-AWARE MATCH TABLES

FIELD OF THE INVENTION

The present invention relates generally to data communication networks, and particularly to network elements with congestion-aware match tables.

BACKGROUND OF THE INVENTION

Network elements, such as network switches, commonly process packets using match tables. Match tables are also referred to as flow tables or Access Control Lists (ACLs). Typically, a match table comprises multiple entries, each specifying (i) a combination of packet-header attribute values, and (ii) an action to be applied to packets that match the combination of packet-header attribute values. One common implementation of a match table is using Ternary Content-Addressable Memory (TCAM).

SUMMARY OF THE INVENTION

An embodiment of the present invention that is described herein provides a network element including a plurality of ports and processing circuitry. The ports are configured for connecting to a communication network. The processing circuitry is configured to receive a packet from the communication network via one of the ports, to assign the packet to a selected queue, to verify whether the packet matches a rule, wherein matching the packet to the rule depends on whether the selected queue is congested, and, when the packet matches the rule, to apply to the packet an action associated with the rule.

In some embodiments, the rule and the action are specified in a match table accessed by the processing circuitry. In an embodiment, the processing circuitry is configured to verify whether the packet matches the rule as part of ingress processing of the packet. In another embodiment, the processing circuitry is configured to verify whether the packet matches the rule as part of egress processing of the packet.

In a disclosed embodiment, the rule is formulated explicitly as depending on whether the selected queue is congested. In another embodiment, the processing circuitry is configured to enable or disable the rule depending on whether the selected queue is congested. In yet another embodiment, the processing circuitry is configured to attempt matching the packet to a first set of rules when the selected queue is congested, and to a second set of rules, different from the first set, when the selected queue is not congested. Typically, the processing circuitry is configured to decide that the selected queue is congested in response to detecting that a fill level of the selected queue exceeds a threshold.

There is additionally provided, in accordance with an embodiment of the present invention, a method for processing packets in a network element. The method includes receiving in the network element a packet from a communication network, and assigning the packet to a selected queue in the network element. A verification is made as to whether the packet matches a rule, wherein matching the packet to the rule depends on whether the selected queue is congested. When the packet matches the rule, an action associated with the rule is applied to the packet.

The present invention will be more fully understood from the following detailed description of the embodiments thereof, taken together with the drawings in which:

BRIEF DESCRIPTION OF THE DRAWINGS

FIG. 1 is a block diagram that schematically illustrates a network switch, in accordance with an embodiment of the present invention; and FIGS. 2-4 are diagrams that schematically illustrate congestion-aware match tables used in network switches, in accordance with embodiments of the present invention.

DETAILED DESCRIPTION OF EMBODIMENTS

Overview

Figure 4:
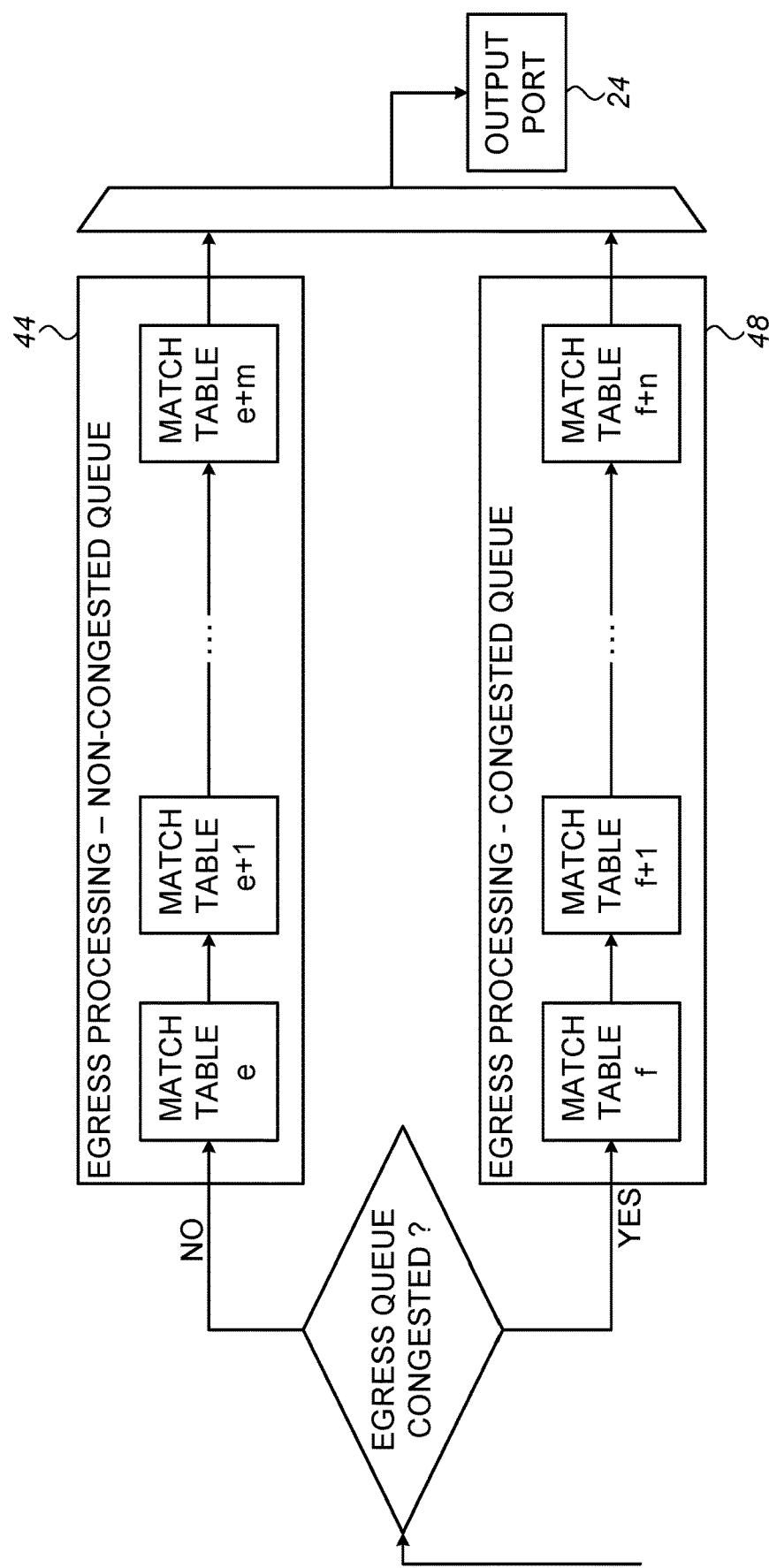

Embodiments of the present invention that are described herein provide improved methods and apparatus for processing packets in network switches and other network elements. In particular, the disclosed embodiments provide match tables whose rule-matching depends on congestion.

In some embodiments, a network switch comprises multiple ports for sending and receiving packets to and from a communication network, and processing circuitry for processing the packets. The processing circuitry comprises one or more match tables, which are used for selectively applying various actions to the packets. Each match table comprises a list of rules, each rule associated with a respective action. When processing a given packet, the processing circuitry attempts to match the packets to the rules. If the packet matches a rule, the processing circuitry applies the corresponding action to the packet.

In some embodiments, the processing circuitry receives packets from the communication network. As part of the packet processing, the processing circuitry assigns the packets to various queues. The processing circuitry also attempts to match the packets to the various rules in the match tables, and applies the appropriate actions depending on the match results.

In some embodiments of the present invention, for at least one of the rules in at least one of the match tables, matching a packet to a rule depends on whether the queue to which the packet is assigned is congested or not. This capability enables the processing circuitry, for example, to specify actions that mirror packets associated with congested queues for further analysis, count packets associated with congested queues, discard or modify such packets, to name just a few examples. Mechanisms of this sort may be used as part of ingress processing, as part of egress processing, or elsewhere.

Several example implementations of congestion-dependent rule-matching are described herein. In one embodiment, the rule is formulated explicitly in the match table as dependent on whether the queue is congested or not. In another embodiment, the rule itself does not depend on congestion, but the processing circuitry enables or disables the rule based on whether or not the queue is congested. In yet another embodiment, the processing circuitry applies different processing pipelines, which differ in at least one of the rules, to packets assigned to congested queues and to packets assigned to non-congested queues. Hybrid solutions and/or combinations of such implementations can also be used.

Unlike conventional match tables that consider only packet-header attributes, the techniques disclosed herein enable the match tables to handle packets differently depending on whether they are subject to congestion. This enhanced functionality is useful, for example, for investigating the root cause of congestion, as well as for resolving congestion.

System Description

FIG. 1 is a block diagram that schematically illustrates a network switch 20, in accordance with an embodiment of the present invention. Network switch 20 is typically part of a communication network (not shown in the figure), and may operate in any suitable type of network and in accordance with any suitable communication protocol, e.g., Ethernet or Infiniband.

Network switch 20 (also referred to simply as "switch" for brevity) comprises a plurality of ports 24, also referred to as interfaces. Ports 24 are used for sending and receiving packets. Each port 24 is typically connected to a respective network link that connects to a port of another network element or to a client computer, for example.

Switch 20 further comprises a hardware-implemented switch fabric 28, which is configurable to forward packets between ports 24. Switch 20 additionally comprises a Central Processing Unit (CPU) 30, also referred to as a processor. Among other tasks, CPU 30 typically configures fabric 28 with the appropriate forwarding scheme, and generally manages the operation of switch 20.

In some embodiments, fabric 28 comprises ingress processing circuitry 32 that applies ingress processing to incoming packets, and egress processing circuitry 36 that applies egress processing to outgoing packets. Ingress circuitry 32 and/or egress circuitry 36 may comprise one or more match tables 40. One or more of these match tables are congestion-aware, as will be elaborated below.

The switch configuration shown in FIG. 1 is an example configuration, which is chosen purely for the sake of conceptual clarity. In alternative embodiments, any other suitable switch configuration can be used. In the present context, fabric 28 and CPU 30 are referred to collectively as "packet processing circuitry" (or simply "processing circuitry" for brevity). The embodiments described herein describe a specific partitioning of tasks ("division of labor") between fabric 28 and CPU 30, purely by way of example. In alternative embodiments, any other suitable partitioning of tasks between the fabric and CPU can be used. Further alternatively, the packet processing circuitry may be implemented using any other suitable components.

Certain elements of switch 20, e.g., ports 24 and fabric 28, may be implemented using hardware/firmware, such as using one or more Application-Specific Integrated Circuits (ASICs) or Field-Programmable Gate Arrays (FPGAs). Alternatively, some switch elements, e.g., CPU 30, may be implemented in software or using a combination of hardware/firmware and software elements. Match tables 40 may be implemented using any suitable solid state memory, e.g., using TCAM.

Typically, CPU 30 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Match Tables with Congestion-Aware Rule-Matching

In a typical mode of operation, fabric 28 of switch receives packets via ports 24 (acting as ingress ports) and forwards the packets from the queues to the desired ports 24 (acting as egress ports). As part of processing the packets, fabric 28 assigns the packets to selected queues. In the present context, the term "queue" refers to any suitable data structure or memory area used for buffering packets. In one example embodiment, fabric 28 maintains a respective queue per combination of {egress port, traffic class}. (Traffic class is denoted in the examples below as "Tclass.") Generally, however, the queues may comprise ingress and/or egress queues of any kind.

In some cases, a given queue may become congested. Congestion typically means that the queue is filled to a level having a risk of excessive latency and/or packet loss. Congestion may occur, for example, due to the queue input rate being higher than the output rate for various reasons. Typically, fabric 28 and/or CPU 30 regards a queue as congested when the fill level of the queue exceeds a threshold. The threshold is typically configurable, and can be set to any desired value by CPU 30.

In some embodiments, one or more of match tables 40 in switch 20 is congestion-aware. The term "congestion-aware match table" means that, for at least one rule in the match table, matching a packet to the rule depends on whether the queue that the packet is assigned to is congested or not. In some cases the matching depends only on congestion (e.g., the packet matches the rule if and only if the queue is congested). In other cases the matching may depend on other factors (e.g., packet header attribute values) in addition to congestion.

FIG. 2 is a diagram that schematically illustrates a portion of a congestion-aware match table, in accordance with an embodiment of the present invention. In the embodiment of FIG. 2, the rules themselves are explicitly specified in the match table as depending on congestion.

In the present example the figure shows two table entries, each specifying a rule and a corresponding action. The first rule instructs fabric 28 to mirror (send a copy of) a packet to CPU 30 if the packet is destined to the queue denoted TxPort2.Tclass3 (the queue holding the packets of traffic class 3 that are pending for transmission via port 2), AND that queue is congested, AND the destination IP address of the packet is 22.23.24.25. The second rule instructs fabric 28 to mirror a packet to CPU 30 if the packet is destined to the queue denoted TxPort2.Tclass5 (the queue holding the packets of traffic class 5 that are pending for transmission via port 2), AND that queue is congested.

FIG. 3 is a diagram that schematically illustrates a congestion-aware match table, in accordance with an alternative embodiment of the present invention. The example of FIG. 3 is logically equivalent to that of FIG. 2. In the embodiment of FIG. 3, however, the rule itself does not explicitly depend on congestion. Instead, fabric 28 enables or disables the rule depending on whether or not the queue that the packet is assigned to is congested. The end result, however, is similar, i.e., matching of a packet to the rule depends on congestion of the queue to which the packet is assigned.

In the present example, the first rule instructs fabric 28 to mirror a packet to CPU 30 if the packet is destined to the queue denoted TxPort2.Tclass3, AND the destination IP address of the packet is 22.23.24.25. In addition, the fabric is configured to enable the first rule if and only if the queue TxPort2.Tclass3 is congested. The second rule instructs fabric 28 to mirror a packet to CPU 30 if the packet is destined to the queue denoted TxPort2.Tclass5. The fabric, however, enables this rule if and only if the queue TxPort2.Tclass5 is congested.

FIG. 4 is a diagram that schematically illustrates congestion-aware match tables, in accordance with yet another embodiment of the present invention. In this example, fabric 28 comprises two egress processing pipelines, a non-congested-queue pipeline 44 and a congested-queue pipeline 48. Each of the two pipelines comprises one or more match tables. As described above, each match table comprises rules and associated actions. Fabric 28 applies pipeline 44 to packets assigned to non-congested queues, and pipeline 48 to packets assigned to congested queues.

Pipelines 44 and 48 differ in at least one of the rules in at least one of the match tables. In some embodiments, although not necessarily, pipeline 48 (applied to packets assigned to congested queues) comprises all the rules and actions of pipeline 44 (applied to packets assigned to non-congested queues), plus one or more rules and actions relating to congestion. Generally, however, the number and types of tables, rules and actions may differ between the two pipelines in any suitable manner.

In one example embodiment, pipeline 44 is empty, i.e., has no match tables, and pipeline 48 comprises one or more match tables. This implementation is highly efficient in terms of computational complexity, latency and power consumption, because the processing circuitry does not perform any table lookup for non-congested queues (which is by far the common scenario). Only in the relatively rare occasion of a congested queue, table lookup in pipeline 48 is warranted.

In some embodiments, a switch may comprise various combinations of the configurations of FIGS. 2-4. For example, a congestion-aware match table can be implemented using a combination of the implementations of FIGS. 2 and 4, or using a combination of the implementations of FIGS. 3 and 4. In some embodiments, although not necessarily, such combinations may use an empty non-congested-queue pipeline 44. A combination of the implementations of FIGS. 2 and 3 can also be used.

Any of the match table structures shown in FIGS. 2-4, or any other suitable table configuration, can be used to implement any of match tables 40 in FIG. 1. In particular, the examples of FIGS. 2-4 are formulated for egress processing, for clarity, but any of the disclosed techniques can also be used as part of ingress processing, or elsewhere in switch 20.

The match tables shown in FIGS. 2-4 are depicted purely by way of example. In alternative embodiments, any other match-table structure, any other rules and/or any other actions can be used. For example, additionally or alternatively to mirroring packets to CPU 30, the match tables may specify any other suitable actions to be applied to packets associated with congested queues (or with a particular congested queue). Some non-limiting examples of such actions may comprise:

Counting the number of packets associated with congested queues (or with a particular congested queue).
Discarding packets.
Probabilistically discarding packets, e.g., discarding if some random variable falls within a specified range.
Modifying one or more packet header field values, e.g., setting the Drop Eligibility Indicator (DEI) or Explicit Congestion Notification (ECN) field of packets associated with congested queues.
Mirroring packets to a selected port, e.g., a port connected to an external analyzer.
Encapsulating and mirroring packets.

Although the embodiments described herein refer mainly to match tables, the disclosed techniques can be used with any other suitable data structure or representation that specifies rules and corresponding actions.

Although the embodiments described herein mainly address network switches, the methods and systems described herein can also be used in other types of network elements, such as in routers and bridges.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   a plurality of ports for connecting to a communication network; and
   processing circuitry, configured to:
      receive a packet from the communication network via one of the ports;
      assign the packet to a selected queue;
      attempt matching the packet to a set of rules specified in a match table, including enabling or disabling a given rule in the match table, and thus causing match operations of subsequent packets against the match table to result in a match or a mismatch to the given rule depending on whether the selected queue is congested; and
      when the packet matches the given rule, apply to the packet an action specified in the match table for the given rule.

2. The network element according to claim 1, wherein the processing circuitry is configured to attempt matching the packet to the set of rules as part of ingress processing of the packet.

3. The network element according to claim 1, wherein the processing circuitry is configured to attempt matching the packet to the set of rules as part of egress processing of the packet.

4. A network element, comprising:
   a plurality of ports for connecting to a communication network; and
   processing circuitry, configured to:
      receive a packet from the communication network via one of the ports;
      assign the packet to a selected queue;
      attempt matching the packet to a set of rules specified in a one or more match tables, including attempting matching the packet to one or more first match tables when the selected queue is congested, and to one or more second match tables, which differ in at least one rule from the first match tables, when the selected queue is not congested;
      when the packet matches a given rule in the first or second match tables, apply to the packet an action specified in the match table for the given rule.

5. The network element according to claim 1, wherein the processing circuitry is configured to decide that the selected queue is congested in response to detecting that a fill level of the selected queue exceeds a threshold.

6. A method for processing packets in a network element, the method comprising:

receiving in the network element a packet from a communication network;

assigning the packet to a selected queue in the network element;

attempting matching the packet to a set of rules specified in a match table, including enabling or disabling a given rule in the match table, and thus causing match operations of subsequent packets against the match table to result in a match or a mismatch to the given rule depending on whether the selected queue is congested; and when the packet matches the given rule, applying to the packet an action specified in the match table for the given rule.

7. The method according to claim 6, wherein attempting matching the packet to the set of rules is performed as part of ingress processing of the packet.

8. The method according to claim 6, wherein attempting matching the packet to the set of rules is performed as part of egress processing of the packet.

9. The method according to claim 6, and comprising deciding that the selected queue is congested in response to detecting that a fill level of the selected queue exceeds a threshold.

10. A method for processing packets in a network element, the method comprising:

receiving in the network element a packet from a communication network;

assigning the packet to a selected queue in the network element;

attempting matching the packet to a set of rules specified in one or more match tables, including attempting to match the packet to one or more first match tables when the selected queue is congested, and to one or more second match tables, which differ in at least one rule from the first match tables, when the selected queue is not congested; and when the packet matches a given rule in the first or second match tables, applying to the packet an action specified in the match table for the given rule.

* * * * *